(12) United States Patent
Yamasaki et al.

(10) Patent No.: US 10,333,859 B2
(45) Date of Patent: Jun. 25, 2019

(54) MULTI-TENANT RESOURCE COORDINATION METHOD

(71) Applicant: Hitachi, Ltd., Tokyo (JP)

(72) Inventors: Kenta Yamasaki, Tokyo (JP); Tomohiro Morimura, Tokyo (JP); Yutaka Kudou, Tokyo (JP); Masaaki Iwasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 309 days.

(21) Appl. No.: 15/121,781

(22) PCT Filed: Aug. 27, 2014

(86) PCT No.: PCT/JP2014/072353
§ 371 (c)(1),
(2) Date: Aug. 26, 2016

(87) PCT Pub. No.: WO2016/030973
PCT Pub. Date: Mar. 3, 2016

(65) Prior Publication Data
US 2017/0019345 A1    Jan. 19, 2017

(51) Int. Cl.
*G06F 9/46* (2006.01)
*G06F 9/50* (2006.01)
(Continued)

(52) U.S. Cl.
CPC ............ *H04L 47/70* (2013.01); *G06F 9/46* (2013.01); *G06F 9/50* (2013.01); *G06F 9/5005* (2013.01);
(Continued)

(58) Field of Classification Search
CPC ......... H04L 47/70; H04L 67/10; H04L 67/34; H04L 67/16; G06F 9/46; G06F 9/50; G06F 9/5005
(Continued)

(56) References Cited

U.S. PATENT DOCUMENTS 7,415,453 B2 *   8/2008   Suzuki ................ G06F 11/3409
7,761,573 B2 *   7/2010   Travostino ............ G06F 9/4856
                                                         709/226
(Continued)

FOREIGN PATENT DOCUMENTS

JP           5256744 B2     8/2013

OTHER PUBLICATIONS

International Search Report of PCT/JP2014/072353 dated Nov. 4, 2014.

*Primary Examiner* — Vivek Srivastava
*Assistant Examiner* — Binod J Kunwar
(74) *Attorney, Agent, or Firm* — Mattingly & Malur, PC

(57) ABSTRACT

In a system, such as a cloud, which allows resource allocation to be flexibly changed in a multi-tenant environment, it is necessary to interchange resources between the tenants. Efficient resource coordination for resource allocation cannot be attained by merely adjusting resource allocation amounts or resource usage amounts. In order to address this problem, the present invention selects an optimum allocation method from among a plurality of resource allocation methods including CPU capping, taking into account each period for which resources must be allocated and the manner in which each tenant uses resources, and then coordinates allocation of resources across the entire system using the selected allocation method. This makes it possible to improve the efficiency of resource coordination even in a multi-tenant environment.

6 Claims, 11 Drawing Sheets

(51) Int. Cl.
*H04L 29/06* (2006.01)
*H04L 12/911* (2013.01)
*H04L 29/08* (2006.01)

(52) U.S. Cl.
CPC .............. *H04L 67/10* (2013.01); *H04L 67/16* (2013.01); *H04L 67/34* (2013.01); *H04L 67/38* (2013.01)

(58) Field of Classification Search
USPC .................................. 709/226; 718/104, 101
See application file for complete search history.

(56) References Cited

U.S. PATENT DOCUMENTS

| | | | | |
|---|---|---|---|---|
| 8,504,689 B2* | 8/2013 | Ferris | .................... | G06F 9/5072 709/226 |
| 8,650,299 B1* | 2/2014 | Huang | .................. | G06F 9/5077 709/226 |
| 8,706,798 B1* | 4/2014 | Suchter | ................. | G06F 9/5038 709/202 |
| 8,769,083 B2* | 7/2014 | Ferris | .................. | G06F 11/3419 705/34 |
| 8,909,783 B2* | 12/2014 | Ferris | .................. | G06F 9/45533 709/226 |
| 9,015,714 B2* | 4/2015 | Vittal | .................... | G06F 9/5072 709/223 |
| 9,509,626 B2* | 11/2016 | Adolph | .................... | H04L 47/70 |
| 9,703,611 B1* | 7/2017 | Christopher | .......... | G06F 9/5083 |
| 2006/0218279 A1* | 9/2006 | Yamaguchi | ......... | H04L 67/1008 709/226 |
| 2009/0183168 A1* | 7/2009 | Uchida | ................. | G06F 9/5027 718/104 |
| 2009/0300635 A1* | 12/2009 | Ferris | .................... | G06F 9/5072 718/104 |
| 2010/0050172 A1* | 2/2010 | Ferris | .................... | G06F 9/4856 718/1 |
| 2010/0138830 A1* | 6/2010 | Astete | ................. | G06F 9/45533 718/1 |
| 2011/0154332 A1* | 6/2011 | Shirae | ................. | G06F 9/45558 718/1 |
| 2013/0019016 A1* | 1/2013 | Anderson | ............. | G06F 9/5077 709/226 |
| 2013/0080641 A1* | 3/2013 | Lui | ......................... | H04L 67/10 709/226 |
| 2013/0268799 A1* | 10/2013 | Mestery | ................. | H04L 67/10 714/4.2 |
| 2014/0082201 A1* | 3/2014 | Shankari | ................ | H04L 47/70 709/226 |
| 2014/0215073 A1* | 7/2014 | Dow | ....................... | H04L 67/10 709/226 |

\* cited by examiner

F I G. 3

TENANT CONFIGURATION INFO 200

(3-a) INTRA-TENANT VIRTUAL MACHINE CONFIGURATION INFO

TENANT 1   201

| VIRTUAL MACHINE | ACTUALLY OPERATING MACHINE | NO. OF CPUs ASSIGNED | MEMORY AMOUNT ASSIGNED [GB] |
|---|---|---|---|
| VM1 | PV1 | 4 | 4 |
| VM2 | PV1 | 4 | 4 |
| ... | ... | ... | ... |

(3-b) PHYSICAL MACHINE CONFIGURATION INFO 206

| PHYSICAL MACHINE | TOTAL NO. OF CPUs | TOTAL MEMORY AMOUNT [GB] |
|---|---|---|
| PV1 | 16 | 32 |
| PV2 | 16 | 32 |
| ... | ... | ... |

FIG. 4

TENANT POLICY INFO

TENANT 1

| POLICY ITEM | | POLICY PARTICULAR |
|---|---|---|
| PRIORITY | | High |
| MIN. REQUIRED QTY | | 4VM |
| TIME SPAN DEFINITION | SHORT TIME | < 24hr |
| | MEDIUM TIME | 24hr < =, 7days > |
| | LONG TIME | > = 7days |
| WAY OF OFFERING RESOURCES FOR SHORT TIME | | CHANGE QTY OF ASSIGNMENT BY CPU CAPPING |
| WAY OF OFFERING RESOURCES FOR MEDIUM TIME | | SHUT DOWN VIRTUAL MACHINE |
| WAY OF OFFERING RESOURCES FOR LONG TIME | | REMOVE VIRTUAL MACHINE |

FIG. 5

TENANT USAGE STATUS INFO

TENANT 1

| VIRTUAL MACHINE | CPU USAGE | MEMORY USAGE | DISK USAGE | NETWORK USAGE |
|---|---|---|---|---|
| VM1 | 20 % | 40 % | 30 IOPS | 200 kbps |
| VM2 | 10 % | 50 % | 30 IOPS | 200 kbps |
| ... | ... | ... | ... | ... |

FIG. 6

RESOURCE COORDINATION RESULT INFO    230

| DESTINATION OF OFFERING | SOURCE OF OFFERING | QTY OF RESOURCES OFFERED | MEANS FOR OFFERING | TIME SPAN OF OFFERING |
|---|---|---|---|---|
| T1 | T2 | CPUs: 2 | CHANGING QTY OF ASSIGNMENT BY CPU CAPPING | BY 06:00:00 ON 2014/06/30 |
|  | T3 | CPUs: 4 | REMOVING VM1 | — |
| ... | ... | ... | ... | ... |

231　232　233　234　235

TENANT POLICY INFO

RESOURCE COORDINATION LEVEL INFO

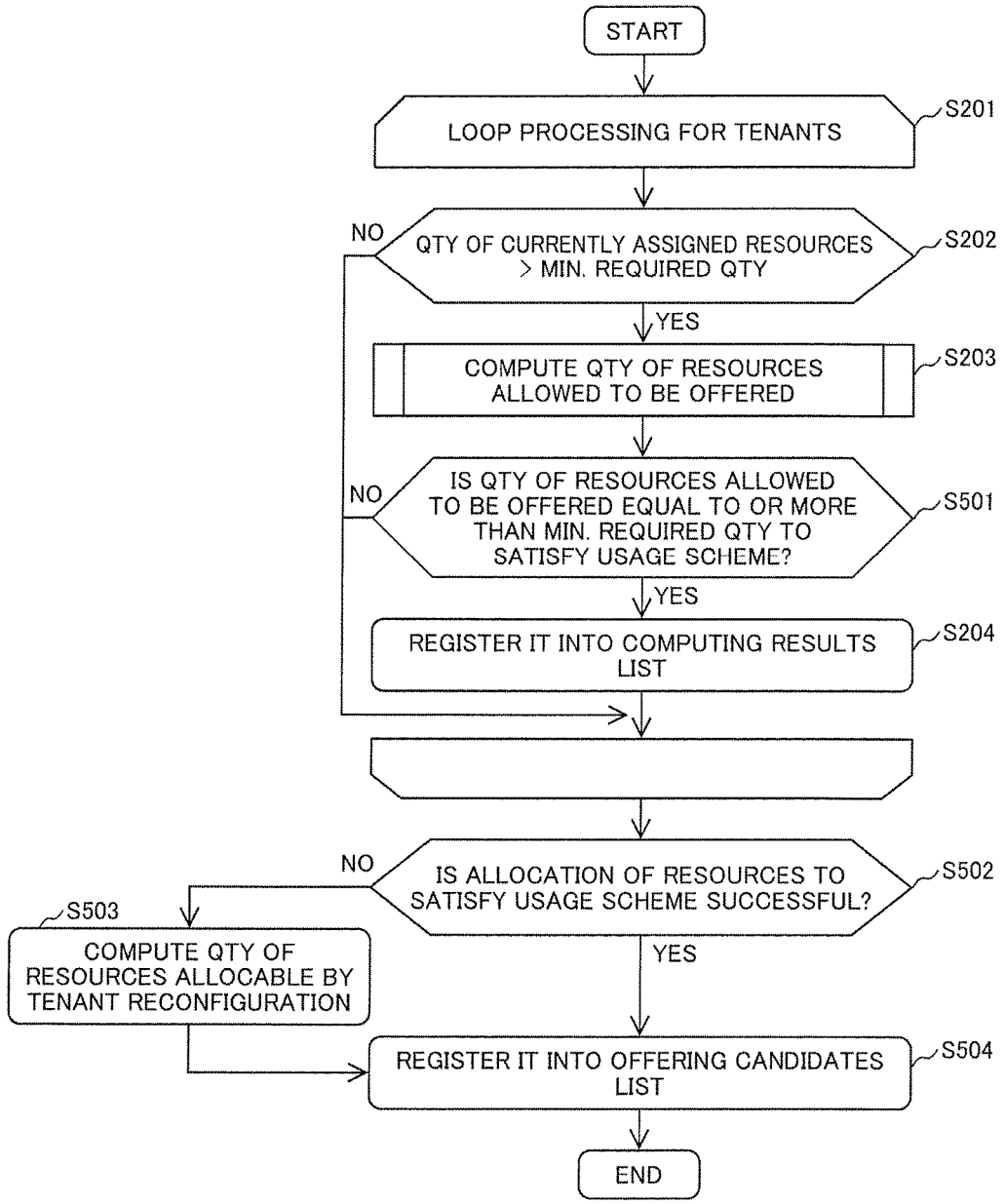

MULTI-TENANT RESOURCE COORDINATION METHOD

TECHNICAL FIELD

The present invention relates to a technique for coordinating resources among multiple tenants.

BACKGROUND ART

In recent years, a computer environment which is called cloud computing and which offers computer resources (hereinafter referred to as resources) on demand in response to user's request has become widely prevalent. In a cloud computing environment, an architecture where multiple business systems of different types having various requirements (such systems will be referred to as tenants hereinafter) run, while sharing resources in a computer environment is common and such architecture is called a multi-tenant environment. In the multi-tenant environment, when a new tenant joins the environment or when a running tenant requires additional resources, it may cause a situation in which there is a lack of available resources enough to meet a resource allocation request which is made to the multi-tenant environment. In Patent Literature 1, a resource allocation method is disclosed which includes a function of adjusting the quantities of resources to be allocated in response to a resource allocation request which is made, referring to the quantities of resources or the quantities of resources used in a computer environment.

CITATION LIST

Patent Literature 1: Japanese Patent No. 5256744

SUMMARY OF INVENTION

Technical Problem

When a tenant requests resource allocation, a certain time span of using resources may be specified for some type of processing such as, e.g., batch processing at night. Thus, whether or not other tenants can offer resources according to a time span of resource allocation should be taken in account. If such time span does not coincide with busy time of a bushiness system running at a tenant, it can be judged that the tenant can offer resources for a medium to long time. In Patent Literature 1, because resource coordination is performed, taking account of only the quantities of resources or the quantities of resources used in a computer environment, no consideration is made for coordination taking account of a time span of resource allocation that a tenant requests.

To deliver and receive resources between tenants smoothly, it is needed for a tenant that leases resources to properly select a way of offering resources. For example, for an instance where a tenant makes a request to add resources for a short time, it is preferable that it is easy to return the resources to the source tenant after the termination of use of the resources. In Patent Literature 1, no consideration is made for determining means for allocating resources, taking delivering and receiving resources into account.

Moreover, there may be a situation where a functionality scheme of resources has to be taken into account to satisfy a resource allocation request by a tenant. For instance, when a tenant makes a request to add resources of two virtual machines and makes a request, with high availability taken into account, for an HA (High Availability) configuration in which the virtual machines should be run on separate physical machines, there may be a need to respond to these requests. In Patent Literature 1, no consideration is made for a resource coordination method taking a functionality scheme of resources into account.

Solution to Problem

In view of the foregoing circumstances, the present invention provides a method for implementing coordination of resources by computing resources allowed to be offered, taking account of a scheme of how a tenant that requests resource allocation is going to use resources including a requested time span of resource allocation requested and what function that the tenant is going to use.

Advantageous Effects of Invention

It is possible to achieve more efficient resource coordination under an environment where plural tenants exist.

BRIEF DESCRIPTION OF DRAWINGS

FIG. 3 A diagram illustrating tenant configuration information in the first embodiment of the present invention.

FIG. 4 A diagram illustrating tenant policy information in the first embodiment of the present invention.

FIG. 5 A diagram illustrating tenant usage status information in the first embodiment of the present invention.

FIG. 6 A diagram illustrating resource coordination result information in the first embodiment of the present invention.

FIG. 13 A flowchart of a process of computing a quantity of resources allowed to be offered in the second embodiment of the present invention.

DESCRIPTION OF EMBODIMENTS

First Embodiment

Figure 1:
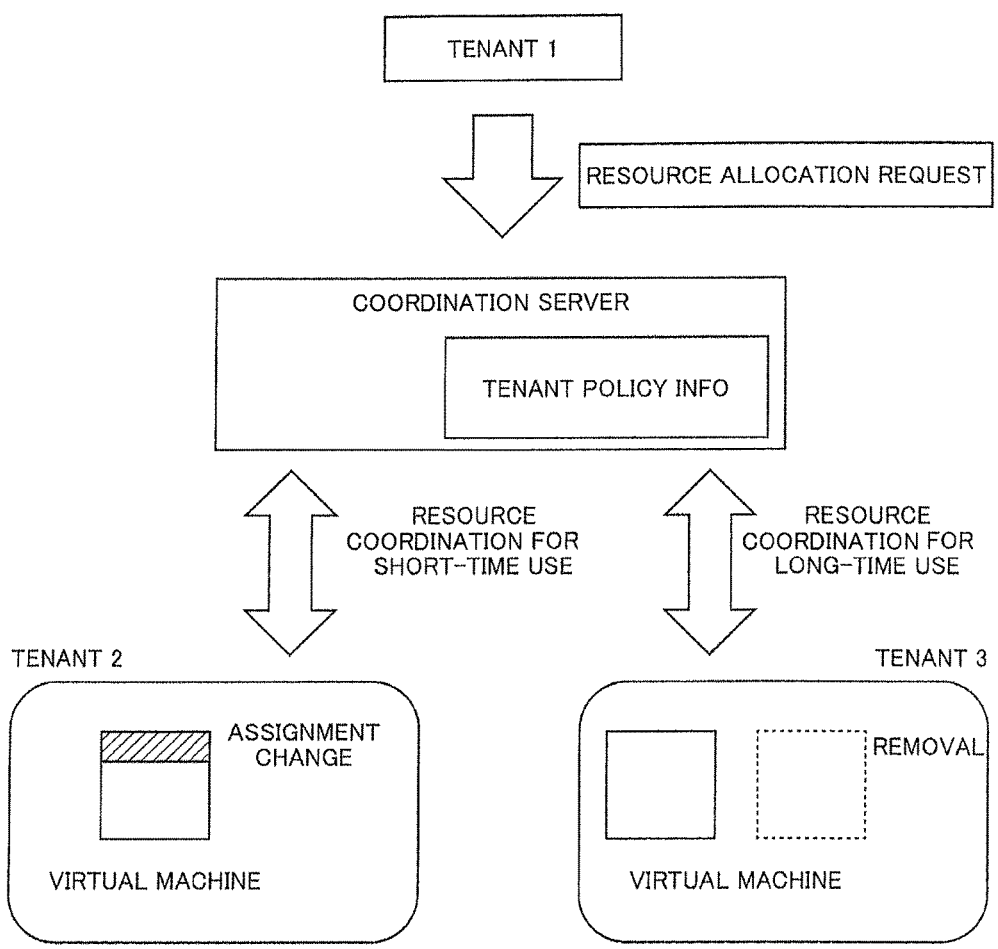
FIG. 1 A diagram illustrating an overview of a first embodiment of the present invention.

FIG. 1 is a diagram explaining an overview of a first embodiment.

First, "tenant 1" which needs resources transmits a "resource allocation request" including various conditions to a "coordination server". The "resource allocation request" includes a category of resources, required quantities of respective resources, and a times span of using resources.

Then, the "coordination server" instructs other tenants, "tenant 2" and "tenant 3" to coordinate their resources based on the "resource allocation request" and "tenant policy information". Here, the "tenant policy information" includes information such as constraints on a per-tenant basis and ways of allocating resources. "Tenant 2" and "tenant 3" instructed to coordinate their resources by the "coordination server" perform resource allocation according to the resource allocation scheme defined in the "tenant policy information". In an example of FIG. 1, "tenant 2" judges that "tenant 1" requests resource allocation for a short time and performs resource allocation by changing the assignment of a quantity of resources assigned to a virtual machine so that the resources can be recovered upon termination of use of the resources by "tenant 1". Likewise, "tenant 3" judges that "tenant 1" requests resource allocation for a long time and performs resource allocation by removing a virtual machine to release resources belonging to the tenant 3 for a long time. In this way, resource allocation among tenants can be carried out efficiently by selecting a way in which each tenant allocates resources depending on the time span of using resources which is one condition of a resource allocation request by a tenant.

Figure 2:
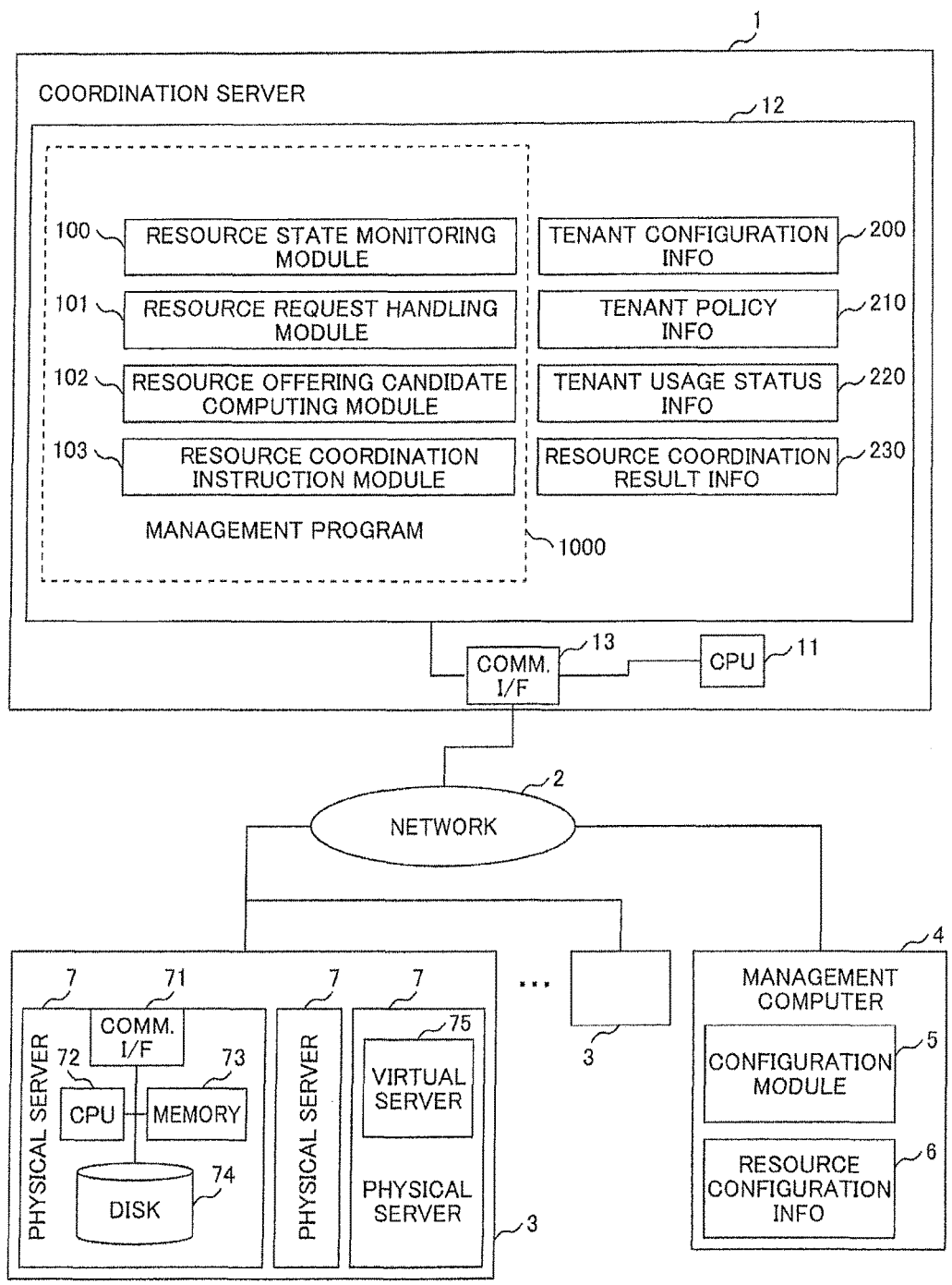
FIG. 2 A diagram illustrating a modular structure of a coordination server in the first embodiment of the present invention.

FIG. 2 is a diagram illustrating a detailed configuration of a coordination server 1.

The coordination server 1 is a computer that manages tenants in a multi-tenant environment and coordinates resources in response to a resource allocation request by a tenant and includes a CPU 11, storage resources 12, and a communication interface 13. The storage resources 12 store various processing modules for coordination, which will be detailed later, and the CPU 11 performs various processing tasks for coordination by executing the various processing modules for coordination. And now, the storage resources 12 may be any device that can store programs and information; for example, it is assumed to be a HDD (Hard Disk Drive), a flash memory, a DRAM, and a combination thereof.

Tenants 3 are a computer cluster which transmits a resource allocation request to the coordination server 1 or a computer cluster which implements resource coordination according to an instruction from the coordination server 1 and are managed by the coordination server 1 across a network. A tenant in a multi-tenant environment is comprised of one or more physical resources or virtual resources. Besides, a physical resource is comprised of one or more physical servers and a physical server includes a communication I/F 71, a CPU 72, a memory 73, and a disk 74 as resources and runs a virtual server 75. In services and applications running in a tenant, for example, a Web system which is comprised of a Web server and a DB server and a batch processing core system which performs batch processing are included.

A management program 1000 is comprised of a resource status monitoring module 100, a resource request response module 101, a resource offering candidate computing module 102, and a resource coordination instruction module 103.

The resource status monitoring module 100 acquires configuration information and resource usage information on tenants 3 periodically or when it is requested to do monitoring and stores those into tenant configuration information 200 and tenant usage status information 220.

The resource request handling module 101 receives a resource allocation request from a tenant 3 and transmits a result of resource coordination processing to the tenant 3 that is the source of the resource allocation request.

Here, a resource allocation request may include information representing physical computers, virtual computers, programs, a category and a quantity of resources allocable for a service, and a time span of using the resources.

As a category of resources, for example, the following can be described: the number of machines, the number of CPUs, CPU frequency, a resource quantity occupied per CPU, a resource quantity reserved per CPU, memory amount, I/O throughput amount, I/O bandwidth amount, a resource quantity occupied per I/O capacity, a resource quantity reserved per I/O capacity, cache amount, etc.

To describe a time span of using resources, a way of specifying start time and time span, a way of specifying end time, or a way of specifying start time only is available. An example of the way of specifying start time and time span is such a description that "resource use for three hours from the present time" or "resource use for 20 hours from 15:00". An example of the way of specifying an end time is such a description that "resource use by 06:00 today" or "resource use by 10:00 on Jul. 2, 2014". An example of the way of specifying a start time only is such a description that "resource use to start from the present time" or "resource use to start from 18:00 on Jul. 29, 2014".

The resource offering candidate computing module 102 computes the quantities of resources allowed to be offered by other tenants 3, based on a resource allocation request from a tenant 3, and stores a result of the computing into resource coordination result information 230.

The resource coordination instruction module 103 instructs tenants 3 to execute means for allocating resources according to the contents of resource coordination result information 230 computed by the resource offering candidate computing module 102.

The management computer 4 is a computer which controls the configuration of physical and virtual resources and has a configuration module 5 which controls the configuration of resources and resource configuration information 6 in a memory. What triggers the configuration module 5 to execute control is, but not limited to, a command for execution issued from a program running on the management computer 4, the coordination server 1, or any other computer; the configuration module 5 may execute control, triggered by accepting an operational input from an administrator. A program running on the management computer 4 creates resource configuration information 6, but no limitation to this is intended; this information may be created by periodically collecting information possessed by programs running on other computers, collecting information possessed by programs running on other computers, triggered by a command for collection issued from an administrator or any other program, or by being input by an administrator. Moreover, the resource configuration information 6 may be used by the configuration module 5, but not limited to this; this information may be offered in response to a command for disclosure issued from any other program.

Then, information to be stored is described by way of FIGS. 3 through 6.

FIG. 3 illustrates tenant configuration information 200. The tenant configuration information 200 is comprised of intra-tenant virtual machine configuration information 201 which defines virtual machine configuration per tenant, illustrated in FIG. 3-a, and physical machine configuration information 206 illustrated in FIG. 3-b. The intra-tenant virtual machine configuration information 201 includes the names of virtual machines 202 which belong to a tenant, the names of actually operating machines 203 on which the virtual machines run, the number of CPUs 204 assigned to each of the virtual machines, and memory amounts 205 assigned to the virtual machines respectively. Furthermore, the physical machine configuration information 206 defines the configuration information of each machine specified in the actually operating machine 203 and the physical machine configuration information 206 includes the names of physical machines 207, the total number of CPUs 208 per machine, and the total memory amount 209 per machine.

The name of each virtual machine 202 may be information by which the virtual machine can uniquely be identified and may be manually recorded by an administrator or may be recorded in such a way that software reads information that has been set for each virtual machine. Likewise, the name of each actually operating machine 203 may be information by which the actually operating machine can uniquely be identified and may be manually recorded by an administrator or may be recorded in such a way that software reads information that has been set for each actually operating machine.

The number of CPUs 204 assigned indicates the number of CPUs assigned to each virtual machine, but may be information indicating how much CPU resources are assigned to each virtual machine and, alternatively, CPU frequency may be used. A category of CPUs assigned to each virtual machine is physical CPU or virtual CPU.

FIG. 4 illustrates tenant policy information 210. The tenant policy information 210 includes policy items 211 and policy particulars 212.

The policy items 211 include tenant's priority, minimum required quantity, time span definition, a way of offering resources for a short time, and a way of offering resources for a long time.

Tenant's priority may be information by which priority comparison with other tenants can be made; for example, "High" indicating that the tenant's priority is high is stored in the "policy particular" field in FIG. 5. To specify priority, numeric values and alphabet letters may be used, besides character strings such as High, Low, Gold, Silver, and Bronze. Furthermore, besides being defined statically, tenant's priority information may change dynamically according to information such as a time zone, a day of week, or a day.

Minimum required quantity indicates a quantity of resources that must be guaranteed to be possessed by the tenant; "4VM" indicating that the tenant must have four virtual machines at a minimum is stored in the "policy particular" field in FIG. 4. Minimum required quantity may be specified per resource category such as CPU amount and memory amount, besides being specified in terms of the number of virtual machines comprised in the tenant.

Time span definition indicates a value of criterion by which a time span that is requested when a tenant issues a resource allocation request is judged as a short time, medium time, or long time and time information such as hours and days is specified. In the "policy particular" field in FIG. 4, information is stored by which the requested time span is judged as a short time if it is less than 24 hours, as a medium time if it is 24 hours or more, but less than 7 days, and as a long time if it is 7 days or more.

A way of offering resources for a short time, a way of offering resources for a medium time, and a way of offering resources for a long time define a way of offering resources for each time span when the requested time span of using resources was judged based on the criterion defined in the "time span definition". In FIG. 4, information is stored that indicates the following: if resource allocation for a short time is requested, means for offering resources by changing a quantity of CPU resources assigned using CPU capping that places a restriction on the quantity of CPUs assigned to virtual machines should be selected; if resource allocation for a medium time is requested, means for offering resources by shutting down an unnecessary virtual machine should be selected; and if resource allocation for a long time is requested, means for offering resources by removing an unnecessary virtual machine should be selected.

The reason for changing a way of offering resources depending on whether the requested time span of resource allocation is long or short is that, when each tenant judges whether it is able to offer resources to another tenant, it has to take the following perspectives into account: the tenant's stability when means for offering resources is applied; processing time it takes to execute means for offering resources; and a load during execution of means for offering resources. In the stability perspective, the way of offering resources by CPU capping is a restriction function on a virtualization infrastructure level so that CPUs of a quantity less than the quantity of CPUs assigned that is cognized by the OS (Operating System) of a virtual machine are only made available. Consequently, a gap occurs between a configuration cognized by the OS and a configuration restricted on the virtualization infrastructure level. Tenants have needs in which they want to withhold the use of CPU capping for a long time span in terms of the stability of system behavior. Therefore, when offering resources to another tenant for a middle or long time, it is more advantageous in terms of the stability of a resource offering-side system to implement releasing and offering resources on a per virtual machine basis by shutting down or removing a virtual machine.

In the perspective of processing time it takes to execute means for offering resources, processing time for offering resources and processing time for recovering the quantity of resources assigned within the tenant itself must be taken into account. Among the ways of offering resources mentioned in FIG. 4, processing time for offering resources by CPU capping and recovering them is the shortest. So, it is defined to select offering resources by CPU capping when offering resources for a short time. In the way of offering resources by shutting down a VM, it is only required to reboot the VM for recovering the resources; whereas, in the way of offering resources by removing a VM, processing to create a new VM is required to recover the resources. Shutting down a VM gives rise to waste from a viewpoint of resource usage as long as the VM is not operating, because the VM that is not used remains after it is shut down; whereas offering resources by removing a VM gives rise to no waste of resources, because resources as much as the removed. VM are released. In view of such characteristics, the way of offering resources by shutting down a VM is defined to be applied to offer resources for a medium time, taking resource recovery processing into account, and the way of offering resources by removing a VM is defined to be applied to offer resources for a long time, taking removal of unused resources into account.

In the perspective of a load during execution of means for offering resources, load impact on the tenant itself and other tenants must be taken into account. Among the ways of offering resources mentioned in FIG. 4, the load produced by the means for offering resources by CPU capping is the smallest, the load produced by shutting down a VM (and VM booting to recover resources) is the second smallest, and the load produced by removing a VM (and creating a new VM to recover resources) is the largest. Therefore, in view of how often each processing occurs, the way of offering resources by CPU capping is defined to be applied when offering resources for a short time, shutting down a VM is defined to be applied to offer resources for a medium time, and removing a VM is defined to be applied to offer resources for a long time.

As described above, resource coordination among tenants can be carried out more effectively by defining different ways of offering resources depending on the time span of offering resources from the perspectives of the tenant's stability when means for offering resources is applied, processing time it takes to execute means for offering resources; and a load during execution of means for offering resources. Although policy information as illustrated in FIG. 4 based on classification by time span is applied in the present embodiment, different ways of offering resources may additionally be based on classification by numerical rating of stability and loads, depending on a policy.

FIG. 5 illustrates tenant usage status information 220. The tenant usage status information 220 includes the names of virtual machines 221 comprised in a tenant, CPU usage 222, memory usage 223, disk usage 224, and network usage 225 for each of the virtual machines.

CPU usage 222 may be information indicating how much CPU resources are used in CPUs assigned to a virtual machine. In FIG. 5, a ratio of CPU usage to the quantity of CPUs assigned is stored in the CPU usage field; however, information such as the number of virtual CPUs in use or frequency may be used.

Memory usage 223 may be information indicating how much memory resources are used in the memory amount assigned to a virtual machine. In FIG. 5, a ratio of memory usage to the memory amount assigned is stored in the memory usage field; however, memory amount in use may be used.

Disk usage 224 may be information indicating how much disk resources are used in disks assigned to a virtual machine. In FIG. 5, IOPS (Input/Output Per Second) with respect to disks is stored in the disk usage field; however, information such as a value indicative of disk read/write performance, disk read/write amount, the amount of disk used, or the amount of space may be used.

Network usage 225 may be information indicating how much network resources are used by a virtual machine. In FIG. 5, the amount of data transmitted and received by a virtual machine per unit time is stored in the network usage field; however, information such as the number of packets transmitted and received by a virtual machine per unit time, or the total amount of data or the total number of packets transmitted and received by a virtual machine during a given period of time may be used.

FIG. 6 illustrates resource coordination result information 230. The resource coordination result information 230 includes, as a result of resource coordination, information presenting a tenant as the destination of offering resources 231, information representing a tenant as the source of offering resources 232, a quantity of resources offered 233, means for offering resources 234, and a time span of offering resources 235.

A quantity of resources offered 233 may be information indicating a quantity of resources that a tenant 232 as the source of offering offers to a tenant 231 as the destination of offering. In FIG. 6, information representing that a tenant "T2" offers resources as much as two CPUs to a tenant "T1" and a tenant "T3" offers resources as much as four CPUs to the tenant "T" is stored in the relevant fields. Information that is stored in the field, "a quantity of resources offered" 233, may include plural resource categories; e.g., information representing CPU and memory resources, such as "CPUs: 2, Memory: 1 GB", may be stored.

Moreover, units of resources may be represented in units of virtual machines, instead of quantity by resource category. For instance, if a tenant removed its one virtual machine to offer resources, the removed virtual machine is recorded as "virtual machine: VM1 removed"; in this way, information indicating a particular virtual machine may be stored as a quantity of resources offered.

Means for offering resources 234 may be information indicating means for offering resources by which a tenant as the source of offering 232 offers resources to a tenant as the destination of offering 231. In FIG. 6, information representing that a tenant "T2" offers a quantity of resources indicated in the field "a quantity of resources offered" 233 to a tenant "T1" using means that is "changing a quantity of assignment by CPU capping" and information representing that a tenant "T3" offers a quantity of resources indicated in the field "a quantity of resources offered" 233 to the tenant "T1", using means that is "removing a VM" are stored in the relevant fields.

A time span of offering 235 indicates a time span during which a tenant as the source of offering 232 offers resources specified in the field "a quantity of resources offered" 233 to a tenant as the destination of offering 231. In FIG. 6, information representing that a tenant T2 offers resources to a tenant T1 for a time span "by 06:00:00 on 2014/06/30" and information representing that a tenant T3 offers resources to the tenant T1 with no specification of a time span of offering are stored in the relevant fields.

Figure 7:
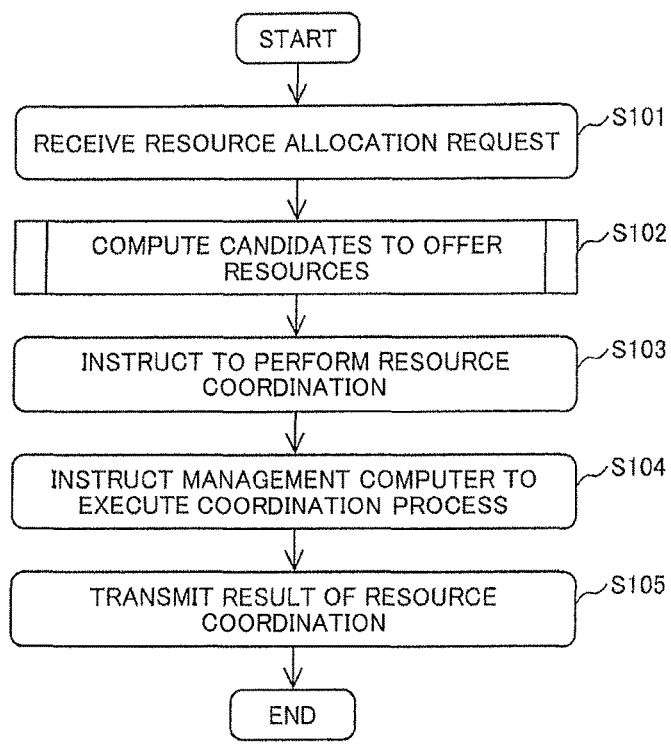
FIG. 7 A flowchart illustrating an overall process of the first embodiment of the present invention.

FIG. 7 is a diagram illustrating a flowchart of a process handling a resource allocation request in a multi-tenant environment. Descriptions are provided below according to the flow.

The management program receives a resource allocation request from a tenant (step S101). The resource allocation request may include information representing physical computers, virtual computers, programs, a category and a quantity of resources allocable for a service, and a time span of using the resources and, for instance, includes information such as "CPUs: 8 core, a time span of use: 6 hours".

Next, based on the resource allocation request received at (step S101), the management program computes tenant candidates to offer resources (step S102). Detail on this processing will be described by way of FIGS. 8 and 9.

Next, the management program instructs the tenant candidates computed at (step S102) to perform resource coordination and receives results (step S103). An instruction to perform resource coordination may be transmitted to software that manages physical machines, virtual machines, physical resources, virtual resources, logically divided resources, etc. via an API (Application Programming Interface) or an SDK (Software Development Kit). Moreover, an instruction to perform resource coordination may be transmitted to an administrator who administers a computer environment by means such as e-mail.

Next, the management program instructs the management computer to execute a resource coordination process (step S104) using the results of coordination performed at (step S103). As means by which the management program instructs the management computer to execute a resource coordination process, the management program can give an instruction to execute it via an open API (Application Programming interface) used by the management computer and, besides, the management program or administrator may give an instruction to execute it by operating a GUI (Graphical User Interface) or CLI (Command Line Interface) provided by the management computer. After the management program or administrator gives an instruction to execute a resource coordination process to the management program, the management program queries the management computer about a result of the coordination process at fixed intervals to know a result of the coordination process. However, another way to allow the management program to check a result of the coordination process is possible; the management computer may notify the management program of a result of the coordination, thus allowing the management program to check it.

Next, the management program transmits a result of the coordination performed at (step S104) to the tenant that transmitted the resource allocation request (step S105). The coordination result includes a category and a quantity of resources allocated and information identifying a server that allocated resources; for instance, it includes information such as "Server-1: CPUs: 4 core allocated, Server-2: CPUs: 4 core allocated", which means that 4 core CPUs were allocated from a server labeled "Server-1" and 4 core CPUs were allocated from a server labeled "Server-2".

Figure 8:
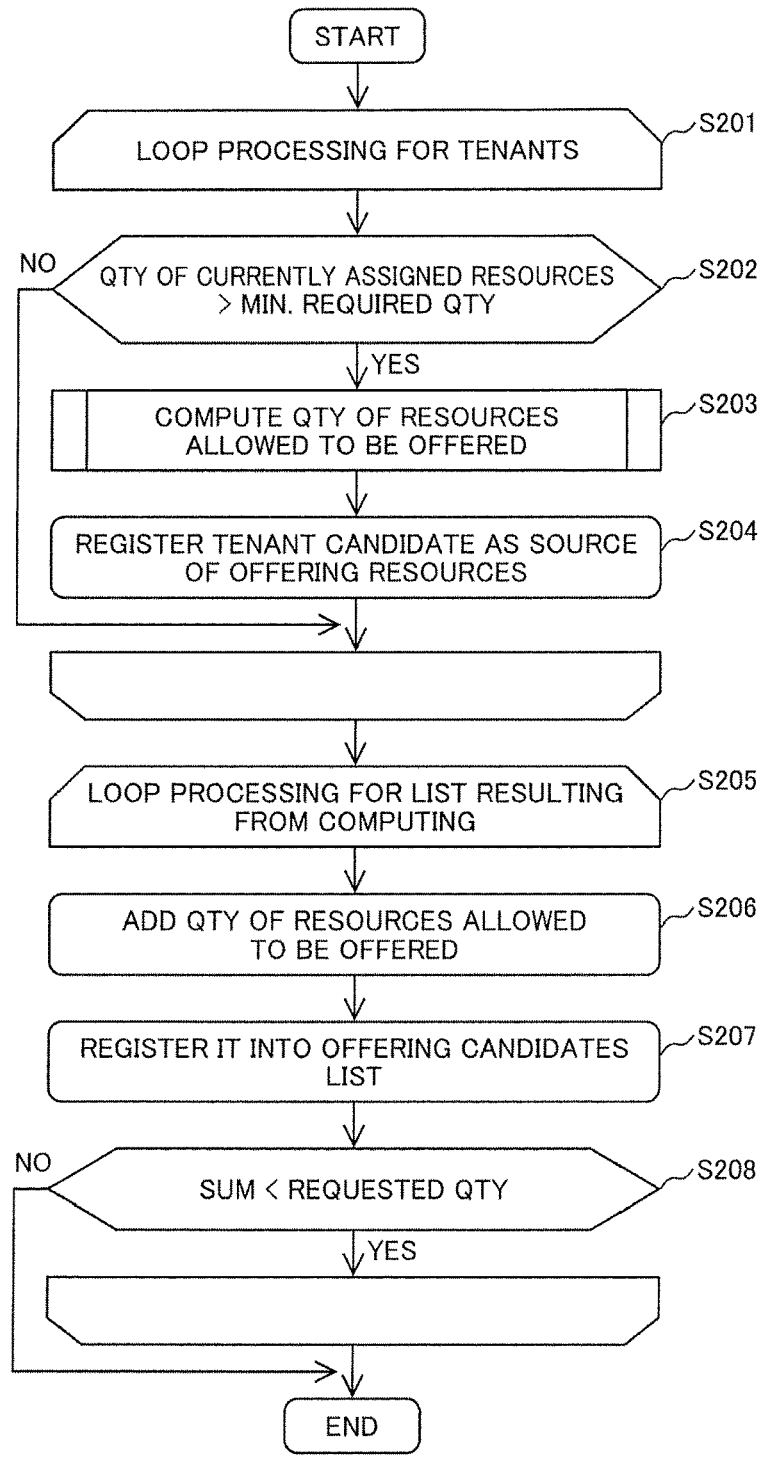
FIG. 8 A flowchart of a process of computing candidates to offer resources in the first embodiment of the present invention.

FIG. 8 is a flowchart illustrating in detail a process of computing candidates to offer resources at (step S102) which is executed by the resource offering candidate computing module within the management program. Descriptions are provided below according to the flow.

The resource offering candidate computing module refers to the tenant configuration information 200, acquires a list of tenants, and executes processing of steps, (step S202) through (step S204), for each tenant (step S201).

Next, the resource offering candidate computing module refers to the tenant configuration information 200, tenant policy information 210, and tenant usage status information 220, and checks for each tenant whether the quantity of currently assigned resources within the tenant is more than the minimum required quantity which is defined in the tenant policy (step S202). It is indicated by an example of FIG. 4 that the minimum required quantify for "tenant 1" is "4VM" (4 virtual machines). Further referring to the intra-tenant virtual machine configuration information (FIG. 3-a) for the "tenant 1", the module acquires the number of virtual machines that are now running within the "tenant 1" and checks whether virtual machines as many as satisfying the minimum required quantity of 4 virtual machines are running (step S202).

If the tenant's resources are equal to or less than the minimum required quantity, the module judges that no resources are allowed to be offered to another tenant and changes the object of processing of (step 201) to a next tenant. If resources more than the minimum required quantity are assigned within the tenant, the processing proceeds to (step S203).

Next, the resource offering candidate computing module computes a quantity of resources allowed to be offered by the tenant (step S203). Detail on this processing will be described by way of FIG. 10. Then, the resource offering candidate computing module registers a result of the computing performed at (step S203) as a tenant candidate as the source of offering resources (step S204). The tenant candidate as the source of offering resources is held by the management program and, as the tenant candidate as the source of offering resources, the name of the tenant as the source of offering resources and information of resources allowed to be offered by it are registered.

Next, the resource offering candidate computing module refers to tenant candidates as the sources of offering resources and executes processing of steps, (step S206) through (step S208), for each tenant candidate (step S205).

Next, the resource offering candidate computing module adds a result of the computing as a quantity of resources allowed to be offered (step S206).

Next, the resource offering candidate computing module registers a result of the computing into an offering candidates list (step S207).

Next, the resource offering candidate computing module checks whether the sum resulting from the addition performed at (step S206) is equal to or more than the requested quantity included in the resource allocation request (step S208). If the sum resulting from the addition is less than the requested quantity, the module acquires a next result of the computing and continues processing, returning to (step S206). If the sum is equal to or more than the requested quantity, the module terminates the loop processing of (step S205) and stores information registered in the offering candidates list into the resource coordination result information 230.

A way of selecting a tenant as the source of offering resources from tenant candidates as the sources of offering resources at (step S205) may be first selecting a tenant with the lowest priority, i.e., selecting in ascending order of priority, by referring to the tenant policy 210. Another way of selecting may be first selecting a tenant including a quantity of resources allowed to be offered, the quantity that is the closest to the requested quantity of resources included in the resource allocation request, in order to decrease the number of servers to offer resources. Alternatively, a selection may be made first of a tenant in which the rate of utilization of resources is low by referring to the tenant usage status information 220.

Figure 9:
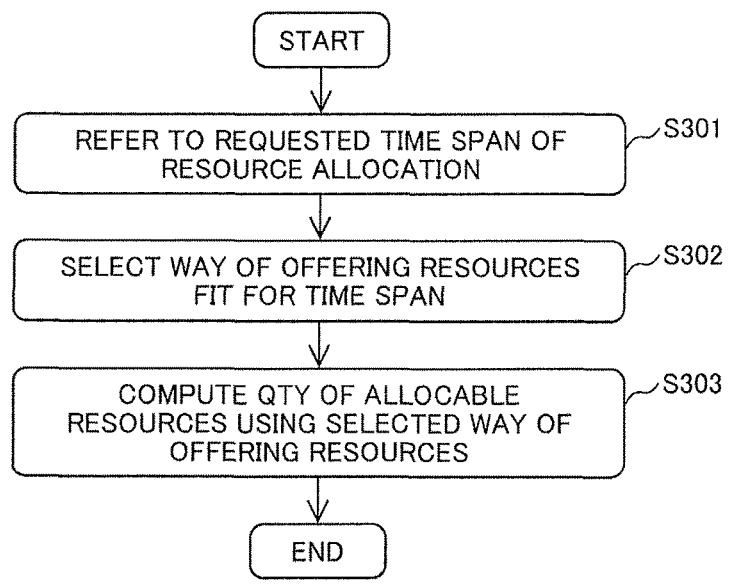
FIG. 9 A flowchart of a process of computing a quantity of resources allowed to be offered in the first embodiment of the present invention.

FIG. 9 is a flowchart illustrating in detail a process of computing a quantity of resources allowed to be offered at (step S203) which is executed by the resource offering candidate computing module within the management program. Descriptions are provided below according to the flow.

The resource offering candidate computing module refers to the resource allocation request and acquires information indicating, a requested time span of using resources (step S301). For instance, if the resource allocation request includes information such as "CPUs: 8 core, a time span of use: 6 hours", the requested time span of allocation is "the time span of use: 6 hours".

Next, the resource offering candidate computing module refers to the tenant policy information 210 and selects a way of offering resources fit for the time span information acquired at (step S301) (step S302). According to the example of FIG. 4, if having acquired "the time span of use: 6 hours" as the requested time span of allocation, the module judges it by the tenant policy information 210 as "short time", because the requested time span of allocation is less than 24 hours, and selects "changing a quantity of assignment by CPU capping" as a way of offering resources.

Next, the resource offering candidate computing module refers to the tenant policy information 210 and computes a quantity of allocable resources using the way of offering resources selected at (step S302) (step S303). According to the example of FIG. 4, in an instance where "changing a quantity of assignment by CPU capping" was selected as a way of offering resources, to compute a quantity of allocable resources according to the way of offering resources, a way of computing a quantity of CPU resources assigned more than those used as a quantity of allocable resources by computing a tendency of using CPU resources in steady operation through the use of history information in the tenant usage status information 220 can be applied.

Furthermore, a combination of plural ways of offering resources may be used as a way of offering resources. In an instance where a way of offering resources which is removing a virtual machine is selected, when the processing load on the tenant suddenly increases after the removal of a virtual machine, there may occur a need to add a new virtual machine and recover the configuration before the removal to boost the tenant's processing performance. Since it takes time to add a virtual machine, the tenant lacks processing performance before the addition of a virtual machine and a situation may occur in which the tenant cannot provide a satisfactory service to its users. For this reason, a way, as described below, can be applied: when removing a virtual machine, CPU capping is applied beforehand to other virtual machines remaining within the tenant and; when there is a sudden increase of the processing load, the processing performance of the virtual machines are temporarily boosted by changing the CPU capping setting and processing to add a new virtual machine is performed as back end processing. For example, let us suppose an instance where CPU capping of 2 cores is set for a virtual machine to which 6 cores were assigned and this machine is virtually regarded as a 4-core virtual machine. For a tenant comprised of three units of such virtual machine, when one virtual machine is removed, two virtual machines having an available capacity of two cores remain. When the load increases suddenly, by changing the CPU capping setting of these virtual machines and reconfiguring the virtual machines to those to which 6 cores are assigned, processing performance of a total of 4 cores as much as that of one virtual machine removed will be added. While processing is performed by two 6-core virtual machines, processing to add a new 4-core virtual machine (or a 6-core virtual machine for which 2-core capping should be set) will be performed. After the completion of adding a virtual machine, CPU capping of 2 cores will be set again for the two virtual machines subjected to changing the CPU capping setting. Thus, the original tenant configuration comprised of three virtual machines to which 4 cores are assigned respectively can be recovered.

As per the foregoing, in response to a resource allocation request by a tenant which needs resources, means for allocating resources taking account of a time span for use which is one of requested conditions is executed to allocate resources and, therefore, resource coordination among tenants can be carried out efficiently.

Second Embodiment

A second embodiment of the present invention is described below by way of FIGS. 10 through 12.

In the first embodiment, an administrator has to define in advance "time span definition" for judging a requested time span of resource allocation in the tenant policy information. Since it is just conceivable that "time span definition" varies from tenant to tenant, defining in advance "time span definition" for all tenants, taking account of tenant's usage history information and characteristics is a great burden of work for an administrator. Then, in the second embodiment, setting a coordination level is performed instead of setting time span definition for each tenant, so that a way of coordinating resources is automatically selected and offering resources is performed.

Figure 10:
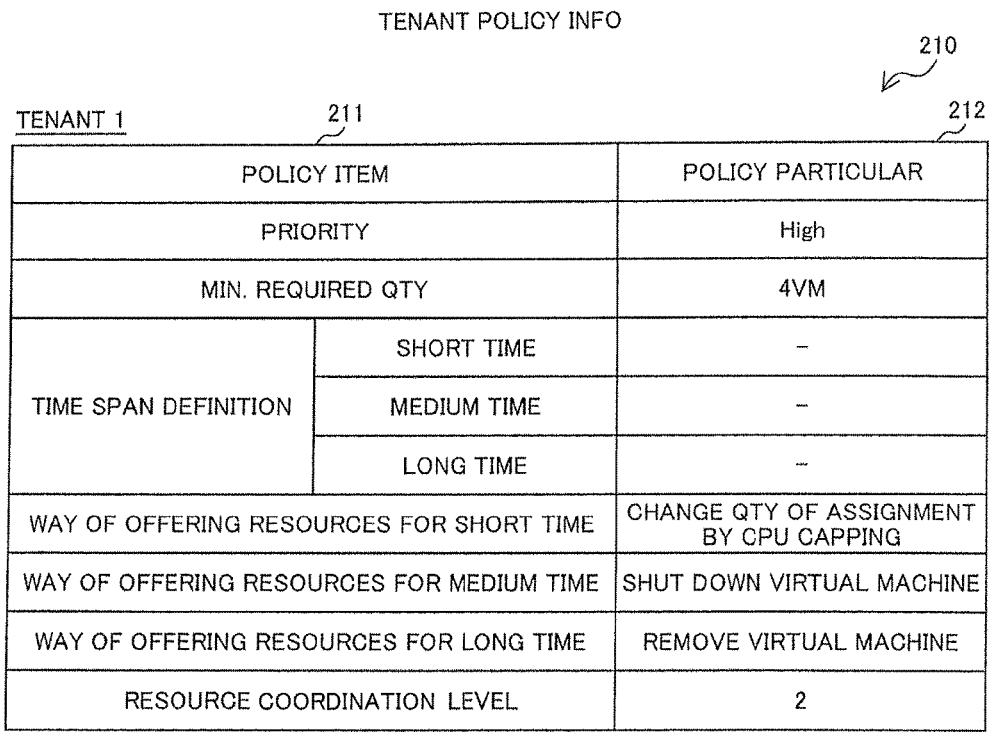
FIG. 10 A diagram illustrating tenant policy information in a second embodiment of the present invention.

FIG. 10 illustrates tenant policy information 210 in the present embodiment. A new item "resource coordination level" is added to tenant policy information 210 and the "time span definition" items are undefined. Here, "resource coordination level" is pointer information to be referred by the coordination server when selecting a way of offering resources and assumes a value representing one of five levels in the second embodiment. If a "resource coordination level" value is 1 or near to 1, selection is made of a way of offering resources, giving weight to the stability of a tenant, when selecting a way of offering resources of the tenant; i.e., more conservative resource coordination is carried out. If that value is 5 or near to 5, selection is made of a way of offering resources, giving weight to shorter processing time and easier execution of a way of offering resources; i.e., more positive resource coordination is carried out.

Figure 11:
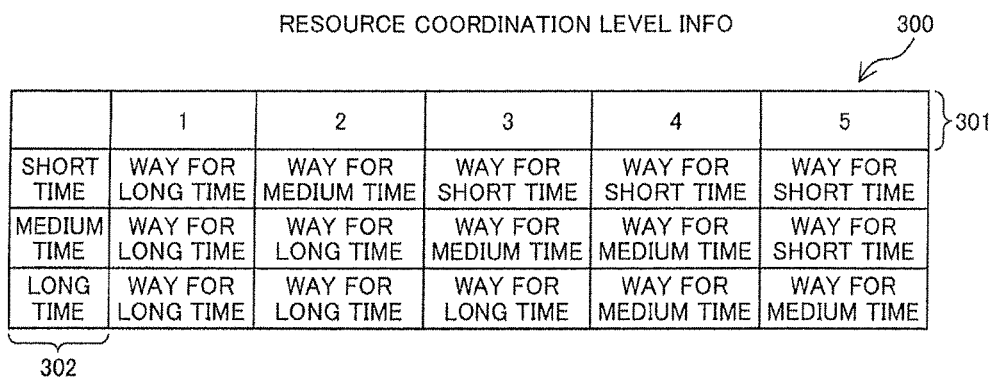
FIG. 11 A diagram illustrating resource coordination level information in the second embodiment of the present invention.

FIG. 11 illustrates resource coordination level information 300 possessed by the management program. The resource coordination level information 300 has two axes of resource coordination level 301 and requested time span of resource allocation 302. In an example of FIG. 10, "2" is set for resource coordination level. Then, in an example of FIG. 11, if the requested time span of resource allocation included in a resource allocation request from a tenant is "medium time", in a column where the value of resource coordination level 301 is "2", a cell in a row "medium time" as the requested time span of resource allocation 302 is referred to and a "way for long time" is selected as a way of offering resources. In the example of FIG. 10, because "remove a virtual machine" is defined for a way of offering resources for a long time, the management program selects "remove a virtual machine" as a way of offering resources in this example.

Figure 12:
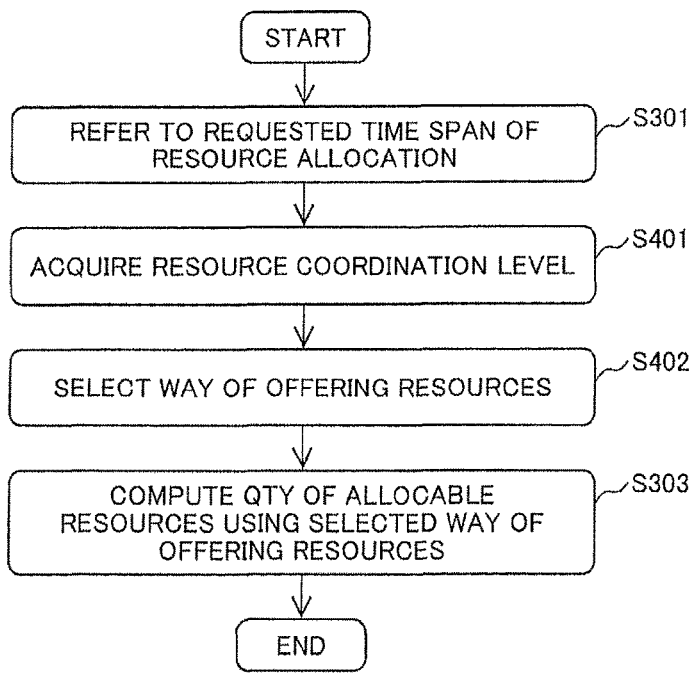
FIG. 12 A flowchart of a process of computing candidates to offer resources in the second embodiment of the present invention.

FIG. 12 is a flowchart illustrating in detail a process of computing a quantity of resources allowed to be offered at (step S203) which is executed by the resource offering candidate computing module within the management program in the second embodiment. Descriptions are provided below according to the flow. Since processing steps (step S301) and (step S303) in the flowchart described for the first embodiment are the same for the second embodiment, processing steps (step S401) and (step 5402) which differ from the foregoing are described.

The resource offering candidate computing module refers to the tenant policy information 210 and acquires a resource coordination level (step S401). It acquires "2" as a resource coordination level according to the example of FIG. 10.

Next, the resource offering candidate computing module selects a way of offering resources, using the requested time span of resource allocation acquired at (step S301), the resource coordination level acquired at (step S401), resource coordination level information 300, and tenant policy information 210 (step S402). Here, descriptions are provided about exemplary ways of judging the requested time span of resource allocation acquired at (step S301) as a "short time", "medium time", or "long time".

A possible way of judging the requested time span of resource allocation as a "short time" is judging it as a "short time" if the requested time span of resource allocation is included within a "time span during which the system shows a proper and stable behavior". As an indicator of a "proper and stable behavior" of the system, a state in which the rate of utilization of resources, such as the rate of utilization of CPUs, is not more than a normal value specified by a system monitoring product or a state in which change of the rate of utilization of resources falls within a normal state specified by the system monitoring product can be used. For example, if a business system was analyzed in a 24-hour frame, it is conceivable that the system behavior during a time span at night when a small number of users utilize the business system is judged as a "normal and stable behavior", excluding daylight hours when a large number of users utilize the business system and the rate of utilization of resources changes to a large degree.

A possible way of judging the requested time span of resource allocation as a "medium time" is judging, as a "medium time", a time span that meets neither "short time" nor "long time" span judgment or a time span included in between "short time" and "long time" spans judged. An alternative way may be judging, as a "medium time", a time span between times judged as busy time by the system monitoring product. For example, weekdays in a week can be judged as a "medium time" or a time span excluding month end days can be judged as a "medium time", since, e.g., a batch processing system experiences concentration of batch processing on weekends or month end days in most cases. Another way may be judging a given multiple of a "short time" as a "medium time"

A possible way of judging the requested time span of resource allocation as a "long time" is judging, as a "long time", the requested time span of resource allocation for which start time is only specified, but end time is not specified. Another way may be judging a given multiple of a "medium time" as a "long time".

The resource offering candidate computing module may query the system monitoring product about a time span judgment and acquire its result or the resource offering candidate computing module may acquire resource monitoring information from the system monitoring product and make a judgment.

Then, based on the way of offering resources selected at (step S402), the resource offering candidate computing module calculates a quantity of allocable resources at (step S303), as is the case for the first embodiment.

As per the foregoing, the administrator only defines a resource coordination level in the tenant policy information without defining in advance "short time", "medium time", and "long time" definitions. Following that, the coordination server automatically selects a way of offering resources based on the requested time span of resource allocation and performs resource allocation. Thus, the administrator's work burdens can be alleviated.

Third Embodiment

A third embodiment of the present invention is described below by way of FIG. 13.

In the third embodiment, a resource allocation request that the resource request handling module 101 receives from a tenant 3 further includes information representing a usage scheme of the requested resources in addition to the contents of the resource allocation request in the first embodiment.

A possible usage scheme of resources is, for example, an HA (High Availability) configuration for ensuring reliability. In an HA configuration, two or more servers are used and, by setting one server to be active another server in standby, quick switching to the standby server can be done in case a fault should occur in the active server. For this reason, if an HA configuration is built with virtual machines, an active virtual machine and a standby virtual machine have to be located in different physical machines and, if an HA configuration is specified as a usage scheme in a resource allocation request, resources must be procured from plural physical machines. For an instance where an HA configuration is included as a usage scheme of resources in a resource allocation request, the request includes a description such as, e.g., "resources for two virtual machines with 4 core CPUs and 4 GB memory for an HA configuration".

FIG. 13 is a flowchart illustrating in detail a process of computing a quantity of resources allowed to be offered at (step S203) which is executed by the resource offering candidate, computing module within the management program in the third embodiment. Since processing steps (step S201) through (step S204) in the flowchart described for the first embodiment are the same for the third embodiment, processing steps (step S501) through (step S504) which differ from the foregoing are described. Descriptions are provided below according to the flow.

The resource offering candidate computing module refers to the resource allocation request and checks whether the quantity of resources allowed to be offered, computed at (step S203), is equal to or more than the quantity required to satisfy a resource usage scheme (step S501). For example, if information representing a resource usage scheme, such as "resources for two virtual machines with 4 core CPUs and 4 GB memory for an HA configuration", is included in the resource allocation information, two or more tenants, each of which is able to offer resources for one virtual machine, must exist to satisfy the HA usage scheme. Therefore, since a tenant that can be a candidate to offer resources must be a tenant that is able to offer resources required for one virtual machine at a minimum, it can be judged that a quantity of resources required to satisfy the resource usage scheme in response to the resource allocation request for "resources for two virtual machines with 4 core CPUs and 4 GB memory for an HA configuration" is the quantify of resources of "4 core CPUs and 4 GB memory" for one virtual machine. If the quantity of resources allowed to be offered, computed at (step S203), satisfies the abovementioned quantity of resources, the resource offering candidate computing module registers it into a computing results list (step S204); the quantity of resources allowed to be offered, computed at (step S203), satisfies the abovementioned, the module changes the object of processing to a next tenant.

Next, the resource offering candidate computing module refers to the computing results list and checks whether allocating the resources satisfying the usage scheme is successful (step S502). In particular, the module judges whether or not the resources of "4 core CPUs and 4 GB memory" have been allocated from two or more tenants, respectively. If the resources have been allocated, the processing proceeds to step S304; if not so, the processing proceeds to (step S503).

Next, the resource offering candidate computing module refers to the tenant configuration information 200 and computes whether the resources satisfying the resource allocation request can be allocated by reconfiguring the configuration of a tenant (step S503). A possible way of this computing is, for example, computing whether or not the resources can be allocated by relocating a virtual machine from a physical machine on which the virtual machine currently runs to another physical machine, based on each set of a physical machine and virtual machines mapped to the physical machine. By way of example, supposing that two physical servers, physical server A and physical server B, exist, simply allocating the resources for two virtual machines on either physical server only cannot satisfy the HA configuration requirement. Then, for instance, by mitigating at least one virtual machine on the physical server B to the physical server A or another physical server, it is checked whether the resources for one virtual machine can be allocated on the physical server B. If so, it can be judged that creating one virtual machine respectively on the physical servers A and B can satisfy the HA configuration requirement.

Lastly, the resource offering candidate computing module registers information representing the resources allowed to be offered into the offering candidates list (step S504).

A usage scheme of resources is not limited to the HA configuration described in the third embodiment. As another usage scheme, when a Disaster Recovery (DR) configuration which is comprised of a site and its backup site is configured, this embodiment can be applied to coordinate the allocation of resources for the site and its backup site. As yet another usage scheme, when plural virtual servers are used and a load distribution configuration is configured by a load balancer, this embodiment can be applied to coordinate the allocation of resources so that the plural virtual servers under control of the load balancer will run on separate physical servers to achieve the highest possible effect of load distribution.

As per the foregoing, in response to a resource allocation request by a tenant which needs resources, means for allocating resources taking account of a functionality scheme which is one of requested conditions is executed to allocate resources and, therefore, resource coordination among tenants can be carried out efficiently.

And now, although the coordination server performs processing relevant to coordination in the embodiments set forth above, the management computer may take on execution of the processing described to be performed by the coordination server.

LIST OF REFERENCE SIGNS

1: Management computer
2: Network
3: Tenant
4: Management computer
1000: Management program

The invention claimed is:

1. A coordination server that connects to a computer system forming a multi-tenant environment, the coordination server comprising a computer programmed to:
store configuration information representing configurations of tenants involved in the multi-tenant environment;
store usage status information representing usage status of each of the tenants; and
store policy information including information on ways of allocating resources by resource usage scheme;
receive from one of the tenants a resource allocation request including information on a requested quantity of resources to be allocated and the resource usage scheme;
refer to the configuration information, the usage status information, the policy information, and the resource allocation request and creating coordination information including tenants to offer resources, a quantity of resources to be offered by each of the tenants, and a way in which resources are offered by each of the tenants;
change a quantity of resources which are allocated to each of the tenants, based on the coordination information; and
output a result of changing the quantity of resources;
wherein information on the resource usage scheme includes a time span of using resources based on the resource allocation request received from the one tenant;
wherein the ways of allocating resources include removing a virtual computer that the one tenant uses, shutting down the virtual computer, and decreasing a quantity of CPUs assigned to the virtual computer by capping; and
wherein the way of allocating resources is decreasing a quantity of CPUs by capping if the time span of using resources is a short time, shutting down the virtual computer if the time span of using resources is a medium time, and removing the virtual computer if the time span of using resources is a long time.

2. The coordination server according to claim 1, wherein information on the resource usage scheme includes a way of using resource by the tenant.

3. The coordination server according to claim 2, wherein, if the way of using resource is an HA configuration, the coordination server creates the coordination information so that resources are allocated to both active and standby systems.

4. A resource coordination method for use in a computer system forming a multi-tenant environment and including a coordination server, the resource coordination method comprising:
transmitting and receiving a resource allocation request including information on a requested quantity of resources to be allocated and a resource usage scheme from a tenant involved in the multi-tenant environment to the coordination server;
referring to configuration information representing configurations of the tenants, usage status information representing usage status of the tenant, policy information including information on ways of allocating resources by the resource usage scheme, and the resource allocation request, and creating coordination information including tenants to offer resources, a quantity of resources to be offered by the tenants, and a way in which resources are offered by the tenants;
changing a quantity of resources which are allocated to each of the tenants, based on the coordination information; and
outputting a result of the changing from the coordination server;
wherein information on the resource usage scheme includes a time span of using resources based on the resource allocation request received from the one tenant;
wherein the ways of allocating resources include removing a virtual computer that the one tenant uses, shutting down the virtual computer, and decreasing a quantity of CPUs assigned to the virtual computer by capping; and
wherein the way of allocating resources is decreasing a quantity of CPUs by capping if the time span of using resources is a short time, shutting down the virtual computer if the time span of using resources is a medium time, and removing the virtual computer if the time span of using resources is a long time.

5. The resource coordination method according to claim 4, wherein information on the resource usage scheme includes a way of using resource by the tenant.

6. The resource coordination method according to claim 5, wherein, if the way of resource is an HA configuration, the step of creating the coordination information further takes account of whether resources can be allocated to both active and standby systems.

* * * * *